(12) United States Patent
Nishimura

(10) Patent No.: US 9,172,534 B2
(45) Date of Patent: Oct. 27, 2015

(54) RANGE SEARCH SYSTEM, RANGE SEARCH METHOD, AND RANGE SEARCH PROGRAM

(75) Inventor: Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 744 days.

(21) Appl. No.: 13/387,060

(22) PCT Filed: Jun. 17, 2010

(86) PCT No.: PCT/JP2010/060292
§ 371 (c)(1),
(2), (4) Date: Jan. 25, 2012

(87) PCT Pub. No.: WO2011/013463
PCT Pub. Date: Feb. 3, 2011

(65) Prior Publication Data
US 2012/0131355 A1    May 24, 2012

(30) Foreign Application Priority Data
Jul. 29, 2009   (JP) ................................ 2009-176986

(51) Int. Cl.
*G06F 17/30* (2006.01)
*G06F 21/00* (2013.01)
*H04L 9/08* (2006.01)
*G11B 20/00* (2006.01)

(52) U.S. Cl.
CPC .............. *H04L 9/0861* (2013.01); *G06F 21/00* (2013.01); *G11B 20/0021* (2013.01)

(58) Field of Classification Search
CPC . H04L 9/0861; G06F 21/00; G06F 17/30106; G11B 20/0021
USPC ....................................................... 713/189
See application file for complete search history.

(56) References Cited

U.S. PATENT DOCUMENTS 7,570,759 B2 * 8/2009 Liu ............................. 380/28
2009/0113213 A1   4/2009 Park et al.

OTHER PUBLICATIONS

Hakan Hacigumus, et al., "Executing SQL over Encrypted Data in the Database-Service-Provider Model", Proceedings of the 2002 ACM SIGMOD International Conference on Management of Data, 2002, pp. 216-227.
Yuko Arai, et al., "Privacy-Preverving Range Query in Outsourced Databases", The Institute of Electronics, Information and Communication Engineers, Proceedings of 19th Data Engineering Workshop, Apr. 7, 2008, pp. 1-9, C1-1.
Zhiqiang Yang, et al., "Privacy-Preserving Queries on Encrypted Data", In Proceedings of the 11th European Symposium on Research in Computer Security, LNCS 4189, 2006, pp. 479-495, ESORICS.

* cited by examiner

*Primary Examiner* — Jung Kim
*Assistant Examiner* — Ayoub Alata
(74) *Attorney, Agent, or Firm* — Sughrue Mion, PLLC

(57) ABSTRACT

In case of a range search to the encryption DB (database), conventionally, because there is a correlation between a value of the data and the number of search keys for the range search, the contents of the encrypted data can be inferred and are not safe. Also, it is not efficient sufficiently in case of insertion of the data, and search. In the present invention, the search keys related by the data are generated for a predetermined number without depending on the value of the data. Also, when the search keys showing a range are generated, the search keys are provided from the search key having a narrow width to the search key having a wide range, and the widths have a relation of a power series length, to suppress the number of necessary search keys.

12 Claims, 10 Drawing Sheets

| ENCRYPTED DATA | DOUBLE ENCRYPTED DATA |
|---|---|
| E6 | H_E6_E_kb0110, H_E6_E_kb011*, H_E6_E_kb01** H_E6_E_kb0***, H_E6_E_kb**** |
| E4 | H_E4_E_kb0100, H_E4_E_kb010*, H_E4_E_kb01**, H_E4_E_kb0***, H_E4_E_kb**** |
| E7 | H_E7_E_kb0111, H_E7_E_kb011*, H_E7_E_kb01** H_E7_E_kb0***, H_E7_E_kb*** |
| E10 | H_E10_E_kb1010, H_E10_E_kb101*, H_E10_E_kb010** H_E10_E_kb1***, H_E10_E_kb**** |
| E3 | H_E3_E_kb0011, H_E3_E_kb001*, H_E3_E_kb00** H_E3_Ekb0***, H_E3_Ekb**** |
| E5 | H_E5_E_kb0101, H_E5_E_kb010*, H_E5_E_kb01**, H_E5_Ekb0***, H_E5_Ekb**** |

| | |
|---|---|
| 0 : 10000<br>00000 | 8 : 01000<br>11000 |
| 1 : 00001<br>00011 | 9 : 11001<br>11011 |
| 2 : 00010<br>00110 | 10 : 11010<br>11110 |
| 3 : 00111<br>00101 | 11 : 11111<br>11101 |
| 4 : 00100<br>01100 | 12 : 11100<br>10100 |
| 5 : 01101<br>01111 | 13 : 10101<br>10111 |
| 6 : 01110<br>01010 | 14 : 10110<br>10010 |
| 7 : 01011<br>01001 | 15 : 10011<br>10001 |

RANGE SEARCH SYSTEM, RANGE SEARCH METHOD, AND RANGE SEARCH PROGRAM

CROSS REFERENCE TO RELATED APPLICATIONS

This application is a National Stage of International Application No. PCT/JP2010/060292 filed Jun. 17, 2010, claiming priority based on Japanese Patent Application No. 2009-176986, filed Jul. 29, 2009, the contents of all of which are incorporated herein by reference in their entirety.

TECHNICAL FIELD

The present invention is related to a range search system, especially to a range search system to an encryption DB (database).

RELATED ART

A technique of an encryption DB (database) is a technique in which data is encrypted and stored in a state that an administrator of the encryption DB does not know what data is stored and what data is subjected to a search. On the other hand, a range search is a search which issues an inquiry (query) to a database (DB) to acquire data in some range from the DB.

An example of a search system in a conventional encryption DB is disclosed in Non-Patent Literature 1 and Non-Patent Literature 2.
(Non-Patent Literature 1)
Non-Patent Literature 1 discloses an encryption DB system which provides a safety search. The search is a search in which an inquiry is carried out to acquire only the data which fully coincides with inquired data from the DB.

A data processing procedure in Non-Patent Literature 1 is separated mainly into two procedures of a data insertion and a data search. The respective procedures will be described below.
(Data Inserting Procedure)
First, data is encrypted with an encryption data generation key so as to generate encrypted data. Next, by using the encryption search key generation key, an encryption search key is generated with a one-way function and so on from the data. Then, the encrypted data is encrypted with the encryption search key so as to generate double encrypted data. The encrypted data and the double encrypted data are related and stored in the encryption DB.
(Data Searching Procedure)
Data to be searched is encrypted by using the encryption search key generation key so as to generate an encryption search key. This encryption search key is transferred to the encryption DB. The encryption DB encrypts each of the encrypted data stored in the encryption DB with the encryption search key, and checks whether or not the encryption result of the encrypted data coincides with the double encrypted data related to the encrypted data. In case of coincidence, the encrypted data is returned as the result.

In this way, in the encryption DB in Non-Patent Literature 1, the original data and inquiries are all encrypted and transferred, and because the encrypted data which are not coincide are left as they are, the safety search can be realized.

However, when a range search is desired, all the data contained in the range need to be searched. For example, when data in a range from 1 to 10 should be range-searched, the data of 1, 2, . . . , 10 need to be complete-coincidence-searched. Therefore, when the range becomes wide, there is a problem that the search cost becomes enormous.
(Non-Patent Literature 2)
Non-Patent Literature 2 discloses an encryption DB system in which the technique of Non-Patent Literature 1 is extended to provide a range search. In Non-Patent Literature 2, when an encryption search key is generated from data, a plurality of search keys for range search are generated from the data, and an encryption search key is generated from each of the search keys.

Below, a method of generating search keys and a method of carrying range search in Non-Patent Literature 2 will be described using a specific example.
(Method of Generating Search Keys)
First, a range where data can take (range) is divided equally into N blocks based on a proper value N. Here, it is supposed that the N blocks are numbered as block 1, block 2, . . . , block N from the smaller block, and index keys of the respective blocks are key 1, key 2, . . . , key N. When some data is contained in block K, key 1, key 2, . . . , key K are allocated for the data as the search keys of the data. In other words, the K double encrypted data are related by this data. For example, it is supposed that the range of the data is from 1 to 8, and is divided equally into four blocks, as shown in FIG. 1. The respective blocks are related to the search keys of k1, k2, k3, k4. Then, as for value of "1", k1 is allocated as the search key, and as for value of "5", k1, k2, and k3 are allocated as the search keys.
[Method of Range Search]
When a range containing a value of the data equal to or larger than M should be searched, what block contains the value M is checked. When the block is the block M, an encryption search key generation key is generated from the search key k3 as an encryption search key. The encryption DB encrypts each encrypted data by using the encryption search key as a key and returns the encrypted data related to the double encrypted data which coincides with the result of the encryption. Oppositely, when a range containing a value less than M should be searched, the encryption DB returns the encrypted data not related to the double encrypted data which coincides with the encryption result. Also, a range search of a value equal to or larger than A or equal to or less than B is realized as an AND operation of results of the two range search.

Referring to an example of FIG. 1, when a range equal to or more than the value "5" should be searched, an inquiry is issued to contain the double encrypted data generated based on the search key k3, and when a range less than the value "5" should be searched, an inquiry is issued not to contain the double encrypted data generated based on the search key k3. In other words, in Non-Patent Literature 2, in a range search of some data, a range search is realized by having all the search keys which data smaller than the data can have.

However, there is a problem with respect to safety in this method. The reason is in that because the search keys are related in proportional to the value, the original value of the encrypted data can be inferred by counting the number of allocated search keys.

For example, as an extreme example of FIG. 1, when not division into four regions but division into eight regions is carried out, the number of the search keys is equal to the value. Also, there is a problem of data insertion cost in this method. The reason is in that if the range width becomes wide so that the number of divisions N increases, the N/2 search keys are averagely allocated for every data, and therefore, the number of double encrypted data to be generated increases.

On the other hand, when the number of divisions N is suppressed to be small, it becomes possible to carry out only a very rough range search.

In the conventional technique, an improved method is proposed which suppresses a data insertion cost by changing to a data search cost. However, the problem of the safety is not still solved.

Citation List

[Non-Patent Literature 1]: "Privacy-Preserving Query on Encrypted Data" by Zhiqiang Yang, Sheng Zhong, and Rebecca N. Wright (Proceedings of the $11^{th}$ European symosium on research in computer security (esorics) lncs4189, pp. 479-495, 2006) <http://www.cs.rutgers.edu/-rebecca.wright/publications/esorics06.pdf>

[Non-Patent Literature 2]: "Privacy-Preverving Range Query in OutSourced Databases" by Yuko ARAI, Chiemi WATANABE, (the $19^{th}$ data engineering workshop (DEWS2008)) <http://www.ieice.org/-de/dews/dews2008/proceedings/files/c1/c1-1.pdf>

SUMMARY OF THE INVENTION

The first problem in the conventional technique is in that the value of the encrypted data can be easily inferred. The reason is in that because there is correlation between the number of the generated search keys and the value, the encrypted value can be inferred by counting the number of double encrypted data.

The second problem in the conventional technique is in that the data insertion cost is large. The reason is in that the data range is wide so that there is data to which a great deal of search keys are allocated when the range search with a precision is realized.

The third problem in the conventional technique is in that a data search cost is large. The reason is in that the search keys proportional to the width of the range are necessary.

The range search system of the present invention includes a data input section for receiving an encryption data generation key, an encryption search key generation key, and data to be inserted in an encryption DB (database); an encrypting section for encrypting the data by using the encryption data generation key to generate encrypted data; a search key generating section for generating search keys for a range search; an encryption search key generating section for encrypting the search keys of the range search by using the encryption search key generation key to generating encryption search keys; and a double encrypting section for encrypting the encrypted data by using each of the encryption search keys. The search key generating section generates the search keys for a predetermined number for range search without depending on a value of the data.

The range search method of the present invention is implemented to an encryption DB (database) by using a computer. The method includes: receiving an encryption data generation key, an encryption search key generation key, and data to be inserted in the encryption DB; encrypting the data by using the encryption data generation key, to generate encrypted data; generating search keys of a predetermined number for a range search without depending a value of the data; encrypting the search keys by using the encryption search key generation key, to generate encryption search keys; and encrypting the encrypted data by using the encryption search key.

The program of the present invention for a range search for making a computer execute: a step of receiving data, encryption data generation key, and an encryption search key generation key to be inserted in an encryption DB (database); a step of encrypting the data by using the encryption data generation key, to generate encrypted data; a step of generating search keys of a predetermined number for range search without depending a value of the data; a step of encrypting the search keys by using the encryption search key generation key, to generate encryption search keys; and a step of encrypting the encrypted data by using the encryption search key. It should be noted that the program of the present invention for the range search can be stored in a storage device and a storage medium.

In this way, in the search to the encryption DB, the unintentional information leakage can be prevented, and the data to be inserted in the encryption DB can be made small. The data search cost can be made small, and it is possible to carry out the safety and efficient range search to the encryption DB.

BRIEF DESCRIPTION OF THE DRAWINGS

FIG. 7 is a diagram showing an example of a gray code notion in an example 1 of the present invention;

FIG. 8 is a diagram showing an example of a record stored in an encryption DB of the present invention;

FIG. 9 is a diagram showing an example of a gray code notion in an example 2 of the present invention; and FIG. 10 is a diagram showing an example of the gray code notion in an example 3 of the present invention.

DESCRIPTION OF EXEMPLARY EMBODIMENTS

First Exemplary Embodiment

Hereinafter, a first exemplary embodiment of the present invention will be described with reference to the attached drawings.

Figure 1:
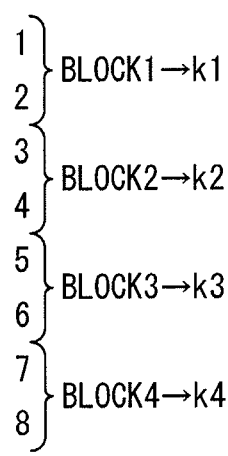
FIG. 1 is a diagram showing four blocks when a data range is equally divided into four blocks.
Figure 2:
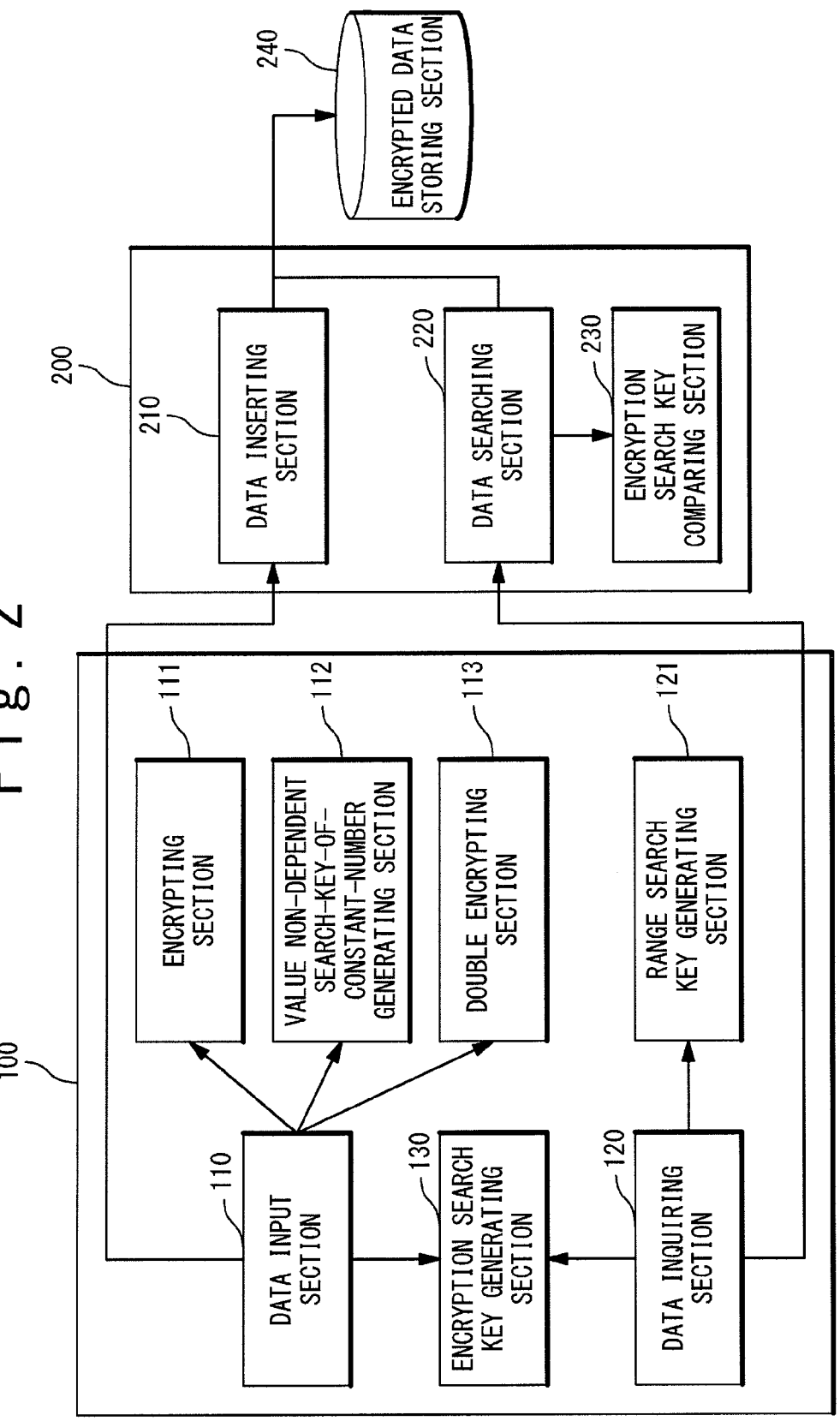
FIG. 2 is a block diagram showing a configuration example of the range search system of a first exemplary embodiment of the present invention.

As shown in FIG. 2, a range search system of the present invention contains a first computer 100 and a second computer 200.

As an example of the first computer 100 and the second computer 200, computers such as a central processing unit, a processor, a data processing apparatus, a PC (a personal computer), a thin client terminal/server, a work station, a main frame, and a supercomputer are exemplified. For example, the range search system of the present invention may be configured as a thin client server system, and the first computer 100 may be configured from clients (a terminals), and the second computer 200 may be configured from a server. However, actually, the present invention is not limited to these examples.

The first computer 100 is provided with a data input section 110, an encrypting section 111, a value non-dependent search-key-of-constant-number generating section 112, a double encrypting section 113, a data inquiring section 120, a range search key generating section 121, and an encryption search key generating section 130.

The second computer 200 is provided with a data inserting section 210, a data searching section 220, an encryption search key comparing section 230, and an encrypted data storing section (encryption DB) 240.

These sections respectively operate roughly as follows.

The data input section 110 receives data to be stored in the encryption DB, an encryption data generation key and an encryption search key generation key.

The encrypting section 111 encrypts the received data by using the encryption data generation key, to generate the encrypted data.

The value non-dependent search-key-of-constant-number generating section 112 generates search keys of a predetermined number (a fixed number) from the received data without depending on a value of the data.

The double encrypting section 113 encrypts the encrypted data by using the encryption search key. The encryption search key is obtained by encrypting each of the search keys by using the encryption search key generation key by an encryption search key generating section 130.

The data inquiring section 120 receives a range of data to be inquired, and generates an inquiry by the search key corresponding to the received range to issue to the encryption DB. Here, the data inquiring section 120 acquires the search keys corresponding to the received range from the range search key generating section 121.

The range search key generating section 121 generates the search keys corresponding to the received range.

The encryption search key generating section 130 encrypts the search keys by using the encryption search key generation key to generate the encryption search keys.

The data inserting section 210 receives the encrypted data and the double encrypted data, and relates them to each other to store in the encrypted data storing section 240.

The data searching section 220 takes out data from the encrypted data storing section 240 and returns the encrypted database on the comparing result by the encryption search key comparing section 230.

The encryption search key comparing section 230 encrypts the encrypted data with the encryption search key and checks whether or not the identical double encrypted data exists.

The encrypted data storing section 240 is equivalent to the encryption DB, and relates and retains the encrypted data and the double encrypted data.

For example, the data input section 110, the encrypting section 111, the double encrypting section 113, the value non-dependent search-key-of-constant-number generating section 112, the data inquiring section 120, the range search key generating section 121, the encryption search key generating section 130, the data inserting section 210, the data searching section 220, the encryption search key comparing section 230, and the encrypted data storing section 240 are realized by hardware sections such as a processor driven based on a program, the software program which drives the hardware sections and executes desired processing, and a memory unit such as a memory which stores the software program and so on. It should be noted that the encrypted data storing section 240 may be comprised of a computer mounted with the memory unit.

As an example of the above-mentioned hardware sections, a CPU (Central Processing Unit), a microprocessor, a microcontroller or a semiconductor integrated circuit (Integrated Circuit (IC)) which has a function of an exclusive use are exemplified. Also, as an example of the above-mentioned storage unit, a semiconductor memory unit such as RAM (Random Access Memory), ROM (Read Only Memory), EEPROM (Electrically Erasable and Programmable Read Only Memory) and a flash memory, an auxiliary storage unit such as HDD (Hard Disk Drive) and SSD (Solid State Drive), or a removable disk such as DVD (Digital Versatile Disk) and SD memory card (Secure Digital memory card), and a storage medium (media) and so on are exemplified. Also, the above-mentioned storage unit is not limited to a storage built in the computer, and may be a peripheral device (external HDD and so on,) and the storage or NAS (Network Attached Storage) which is installed in an external server (a storage server and so on). However, actually, the present invention is not limited to these examples.

Also, as an example of a communication line between the first computer 100 and the second computer 200, the Internet, a LAN (Local Area Network), a wireless LAN (Wireless LAN), a fixation telephone network, a mobile phone network, a lease line, an IrDA (Infrared Data Association), the Bluetooth (registered trademark), a serial communication circuit, a data bus and so on are exemplified. A communication line between the second computer 200 and the encrypted data storing section 240, too, is same. However, actually, the present invention is not limited to these examples.

Figure 3:
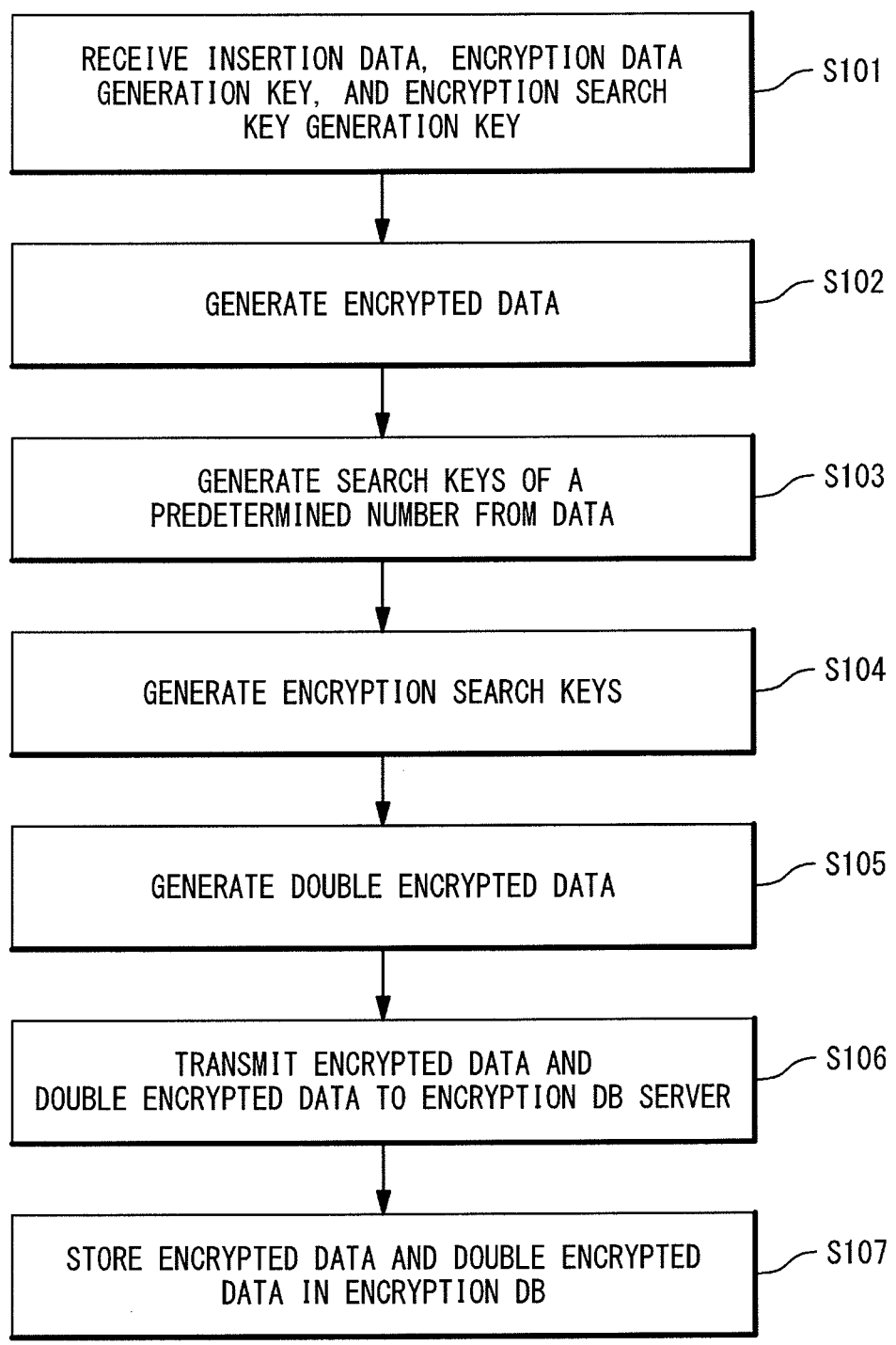
FIG. 3 is a flow chart showing a data input operation in the first exemplary embodiment of the present invention.
Figure 4:
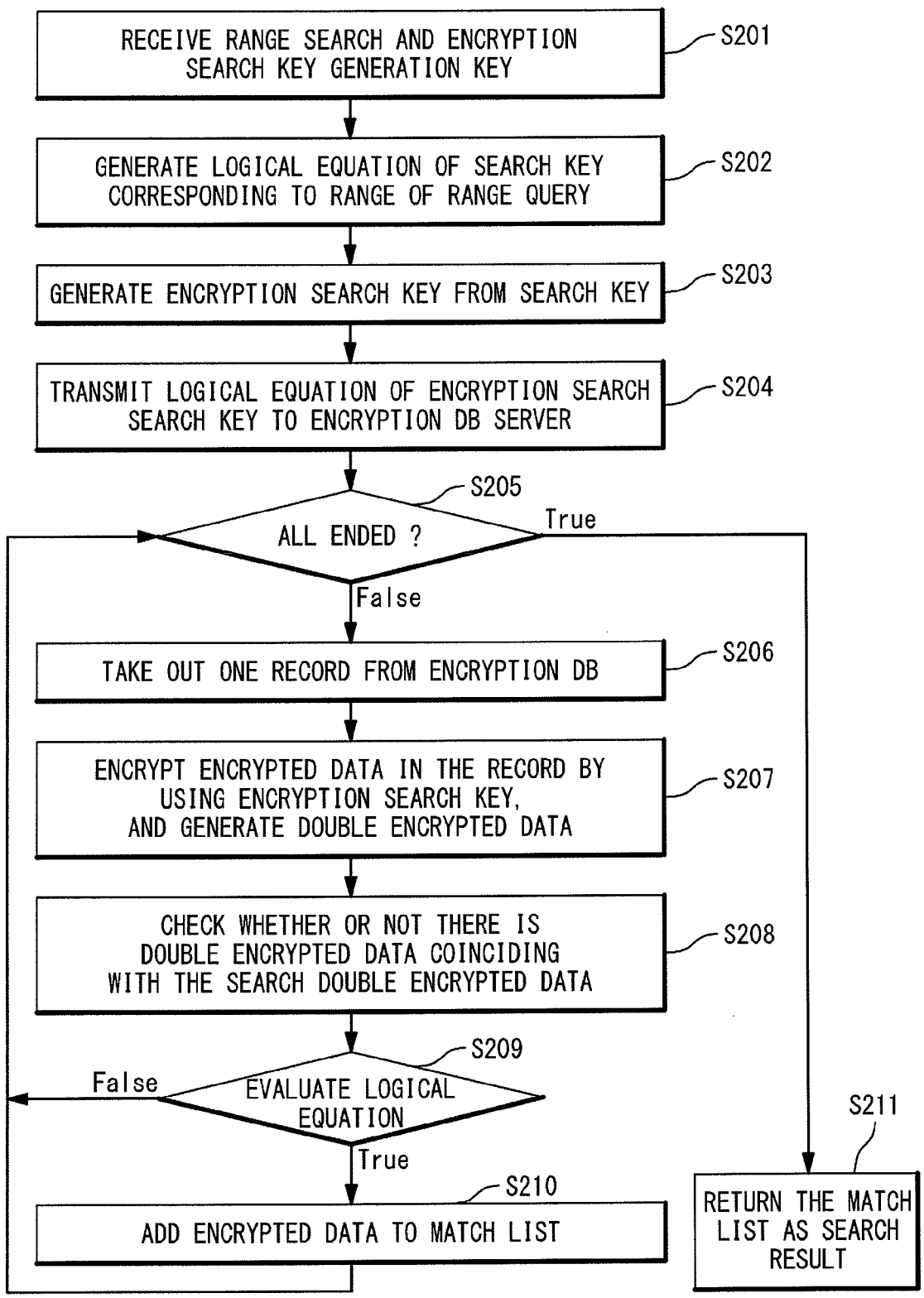
FIG. 4 is a flow chart showing a data inquiring operation in the first exemplary embodiment of the present invention.

Next, a whole operation of the present exemplary embodiment will be described in detail with reference to flow charts of FIG. 3 and FIG. 4. Here, a data input operation and a data inquiry operation will be described separately.

(Data Input Operation)

The data input operation will be described with reference to a flow chart of FIG. 3.

(1) Step S101

First, the data input section 110 receives data to be stored in the encryption DB (the encrypted data storing section 240), an encryption data generation key and an encryption search key generation key.

(2) Step S102

Next, the encrypting section 111 receives the data and the encryption data generation key from the data input section 110, and encrypts the data by using the encryption data generation key to generate encrypted data.

(3) Step S103

Next, the value non-dependent search-key-of-constant-number generating section 112 receives the data from the data input section 110 to generate search keys of a predetermined number. At this time, the search key is related to a range of a width.

When a range of data is given, various ranges can be defined. However, in the present exemplary embodiment, a set of ranges which meets the following condition of these ranges is used. That is, a set of ranges is selected in such a manner that the number of ranges containing a value is a predetermined number, with respect to each of the values in the ranges.

An example of the set of ranges which meets this condition is shown. It is supposed that a range of data is between 1 and 4. In this example, it is supposed that a range between M and N is expressed by [M, N]. For example, it is supposed that the ranges of [1, 2], [2, 3], [3, 4], and [4, 1] are selected. However, [4, 1] is a range that the range is wrapped around, and contains only both of 4 and 1.

In this case, the number of ranges containing each value is as follows:

the set of ranges containing the value of "1" is {[1, 2], [4, 1]}, and the number is two;

the set of ranges containing the value of "2" is {[1, 2], [2, 3]}, and the number is two;

the set of ranges containing the value of "3" is {[2, 3], [3, 4]}, and the number is two; and the set of ranges containing the value of "4" is {[3, 4], [4, 1]}, and the number is two.

In this way, the number of ranges in which each value is contained is a predetermined number (two in this example).

An example which does not meet the condition is shown.

Supposing that the ranges of [1, 1], [1, 2], [1, 3], [1, 4] are selected, the number of ranges containing each value is as follows:

the set of ranges containing the value of "1" is {[1, 1], [1, 2], [1, 3], [1, 4]}, and the number is four;

the set of ranges containing the value of "2" is {[1, 2], [1, 3], [1, 4]}, and the number is three;

the set of ranges containing the value of "3" is {[1, 3], [1, 4]}, and the number is two; and the set of ranges containing the value of "4" is {[1, 4]}, and the number is one.

In this way, the number of ranges containing each value is varied and not predetermined. The conventional technique is one of the examples which do not meet this condition.

(4) Step S104

Next, the encryption search key generating section 130 receives the search keys and the encryption search key generation key generated by the non-dependent search-key-of-constant-number generating section 112, from the data input section 110, and encrypts the search keys by using the encryption search key generation key to generate the encryption search keys.

(5) Step S105

Next, the double encrypting section 113 receives the encrypted data generated by the encrypting section 111 and the encryption search keys generated by the encryption search key generating section 130, from the data input section 110. Using the encryption search key, the double encrypting section 113 encrypts the encrypted data to generate double encrypted data. At this time, because there are the plurality of encryption search keys as mentioned above, the double encrypted data are generated for the number of the encryption search keys.

(6) Step S106

The data input section 110 transmits the encrypted data and the double encrypted data to the data inserting section 210.

(7) Step S107

The data inserting section 210 relates the encrypted data and the double encrypted data which are received to generate one record, and stores the record in the encrypted data storing section 240. Here, the record shows a set of the encrypted data and the double encrypted data.

[Data Inquiry Operation]

Referring to a flow chart of FIG. 4, an operation of inquiring data will be described.

(1) Step S201

First, the data inquiring section 120 receives data of a range subjected to a range search and the encryption search key generation key.

(2) Step S202

Next, the range search key generating section 121 receives the data of the range from the data inquiring section 120 and generates a logical equation of the search keys for the range. The search keys corresponding to the range are generated based on the set of the ranges selected at the step S103. Here, a simple example is shown. For example, it is supposed that the range of the data is between 1 and 4, and that the ranges of [1, 2], [2, 3], [3, 4], [4, 1] are selected. In this case, when a range search between 1 and 2 is requested, the search key corresponding to the range of [1, 2] is generated. Also, when the requested range is not in the set of the selected ranges, the selected ranges are combined so as to configure a search key. That is, when a range search from 1 to 3 is inquired, it is expressed as the logical summation of the range [1, 2] and the range [2, 3].

(3) Step S203

Next, the encryption search key generating section 130 receives the encryption search key generation key and the search keys generated by the range search key generating section 121 based on a neighborhood relation, from the data inquiring section 120, and encrypts the search keys by using the encryption search key generation key, to generate the encryption search keys.

(4) Step S204

Next, the data inquiring section 120 converts the logical equation of the search keys into the logical equation of the encryption search keys by replacing the search keys in the logical equation of the search keys into the encryption search keys, and transmits the logical equation of this encryption search key to the data searching section 220.

(5) Step S205

Next, when receiving the logical equation of the encryption search key, the data searching section 220 confirms whether the processing has ended for all records (all the sets of the encrypted data and the double encrypted data) stored in the encrypted data storing section 240.

(6) Step S206

Next, if there is any un-processed record in the encrypted data storing section 240, the data searching section 220 takes out the un-processed record from the encrypted data storing section 240, and transfers the taken-out record and the encryption search keys to the encryption search key comparing section 230.

(7) Step S207

Next, the encryption search key comparing section 230 receives the taken-out record and the encryption search keys from the data searching section 220, and encrypts the encrypted data in the taken-out record by using the encryption search keys to generate search double encrypted data.

(8) Step S208

Next, the encryption search key comparing section 230 checks whether or not the double encrypted data which coincides with the search double encrypted data exists in the record, and returns the checking result to the data searching section 220.

(9) Step S209

The data searching section 220 evaluates the logical equation of the encryption search keys based on the checking result. In this case, when the checking result indicates that the double encrypted data which coincides with the search double encrypted data exists in the record, the data searching section 220 determines that the evaluation result is true. If the evaluation result is false, the data searching section 220 confirms whether or not there is any un-processed record in the encrypted data storing section 240.

(10) Step S210

If the evaluation result is true, the data searching section 220 determines that the taken-out record is a match record, and adds the encrypted data in the record to a match list. After that, the data searching section 220 confirms whether or not there is any un-processed record in the encrypted data storing section 240. The data searching section 220 repeats the processing from the step S206 to the step S210 to all the records stored in the encrypted data storing section 240.

(11) Step S211

When determining that the processing has ended to all the records stored in the encrypted data storing section 240, the data searching section 220 returns the match list to the data inquiring section 120 as the search result.

In this exemplary embodiment, the search keys of the predetermined number are generated from data without depending on the value of the data and the double encrypted data generated based on them are related to the encrypted data and are stored.

Therefore, because the number of the double encrypted data related to one of the encrypted data is constant, an original value of the encrypted data cannot be inferred in relation to the encrypted data, and the safety can be secured.

Second Exemplary Embodiment

Figure 5:
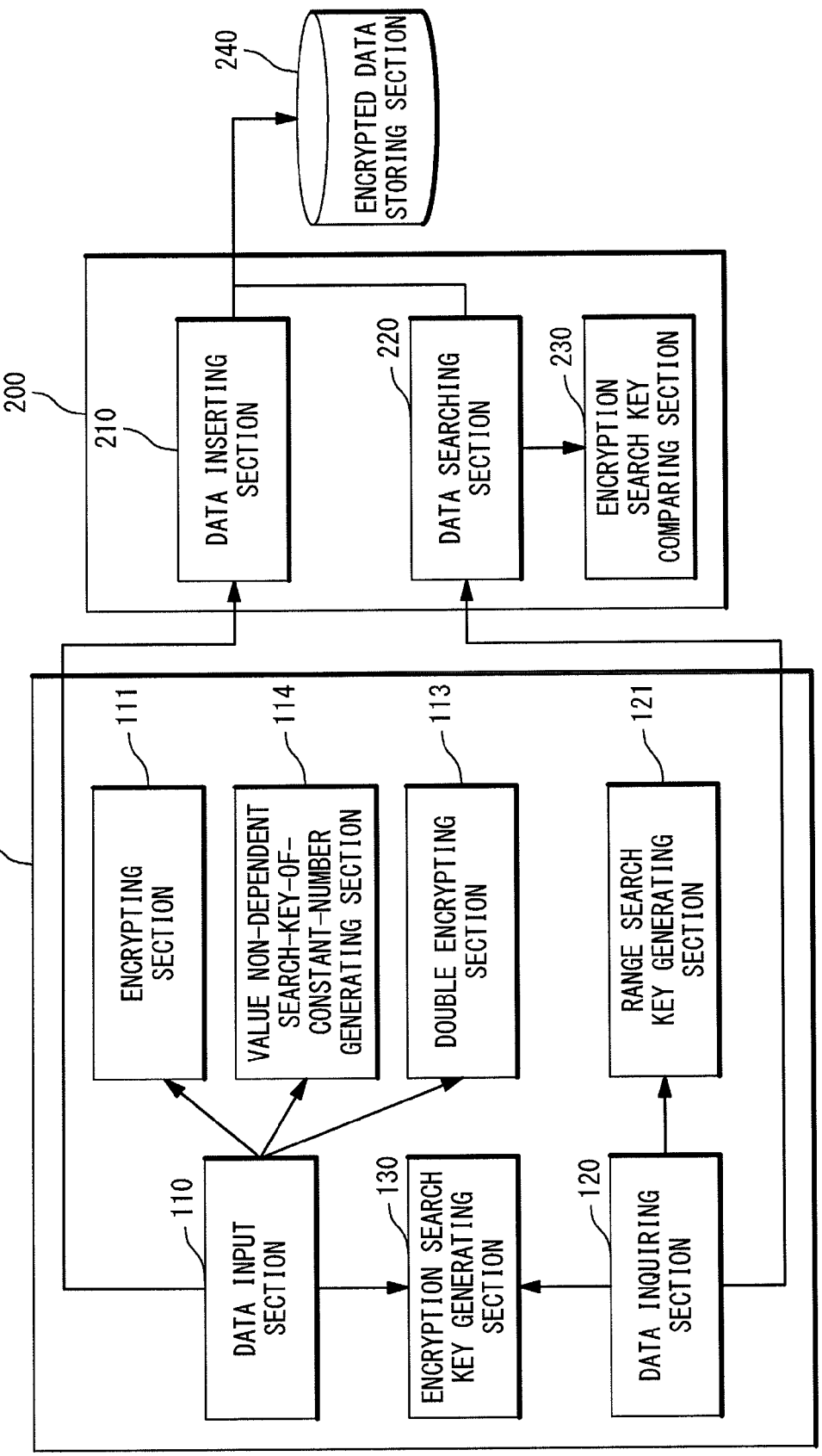
FIG. 5 is a block diagram showing a configuration example of the range search system according to a second exemplary embodiment of the present invention.

Next, the second exemplary embodiment of the present invention will be described in detail. As shown in FIG. 5, the range search system of the present invention contains the first computer 100 and the second computer 200.

The first computer 100 is provided with the data input section 110, the encrypting section 111, the double encrypting section 113, a value non-dependent hierarchized-search-key-of-constant-number generating section 114, the data inquiring section 120, the range search key generating section 121, and the encryption search key generating section 130.

The second computer 200 is provided with the data inserting section 210, the data searching section 220, the encryption search key comparing section 230, and the encrypted data storing section (encryption DB) 240.

The data input section 110, the encrypting section 111, the double encrypting section 113, the data inquiring section 120, the range search key generating section 121, the encryption search key generating section 130, the data inserting section 210, the data searching section 220, the encryption search key comparing section 230, the encrypted data storing section (the encryption DB) 240 are same as those in the first exemplary embodiment.

In the second exemplary embodiment, because the value non-dependent search-key-of-constant-number generating section 112 in the first exemplary embodiment is changed to the value non-dependent hierarchized-search-key-of-constant-number generating section 114, only the difference will be described.

In the value non-dependent hierarchized-search-key-of-constant-number generating section 114, a condition that at least two kinds of ranges corresponding to the search key is added to the condition of the set of the ranges selected by the value non-dependent search-key-of-constant-number generating section 112 in the first exemplary embodiment.

An example of a set of ranges which meets this condition is shown.

It is supposed that the range of the data is between 1 and 4. For example, it is supposed that the ranges of [1, 2], [2, 3], [3, 4], [4, 1], and [1, 4] are selected. At this time, there are two kinds of ranges: one kind of range having the range width of "2" and the other kind of range having the range width of "4", and the number of the sets of ranges the containing each value is three and constant. As a result, for example, when the range search from 1 to 4 is carried out, two search keys are necessary in the example of the first exemplary embodiment, but only a single search key to the range of [1, 4] is necessary in the second exemplary embodiment. Especially, when the range is wide, the effect is large.

In this exemplary embodiment, the set of ranges related to the search key contains a range of a narrow width and a range of a wide width. Therefore, because the range search can be expressed with search keys of a small number even if the search range is narrow or wide in case of range search, the search cost can be suppressed.

Third Exemplary Embodiment

Figure 6:
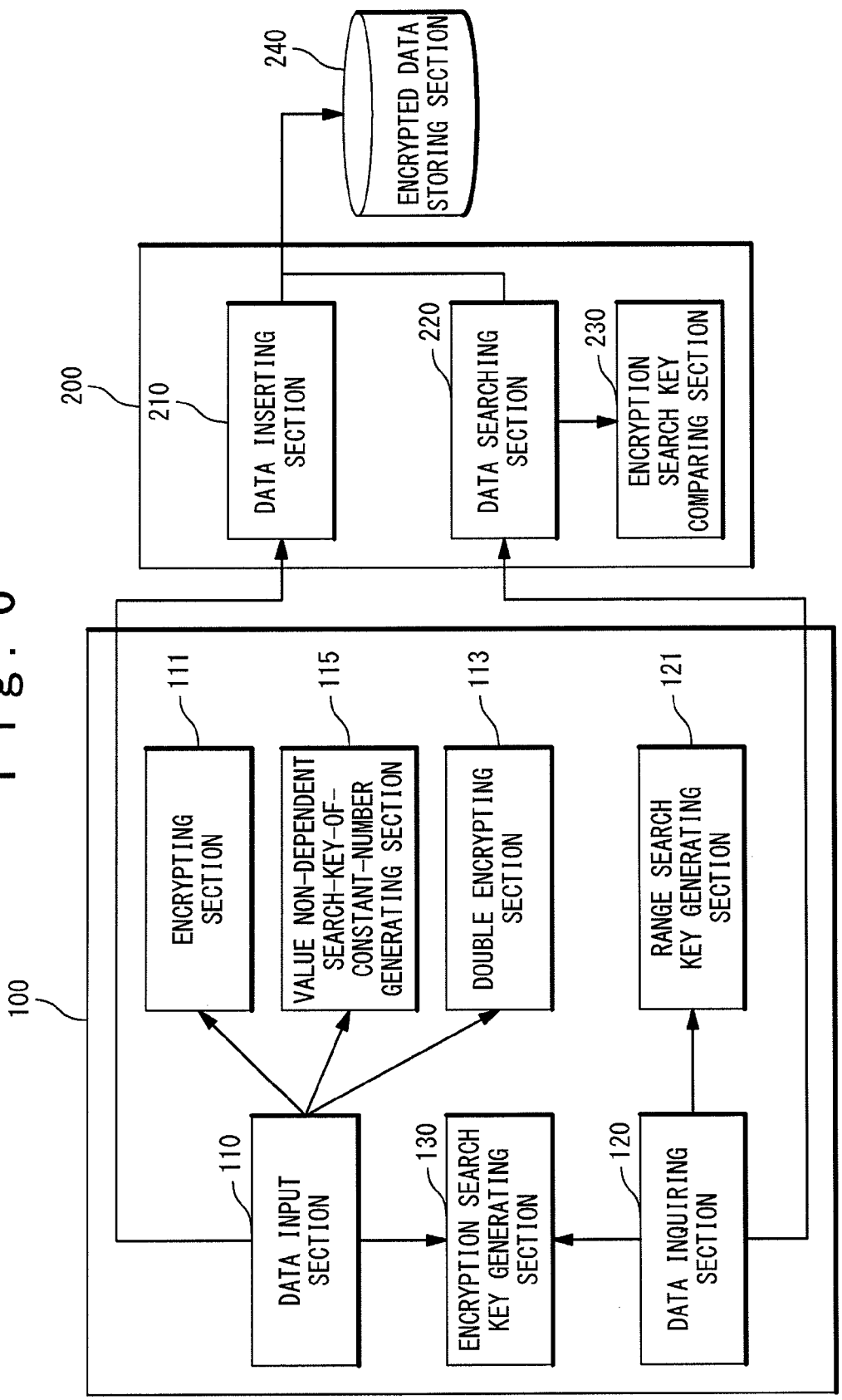
FIG. 6 is a block diagram showing a configuration example of the range search system according to a third exemplary embodiment of the present invention.

Next, the third exemplary embodiment of the present invention will be described in detail. As shown in FIG. 6, the range search system of the present invention contains the first computer 100 and the second computer 200.

The first computer 100 is provided with the data input section 110, the encrypting section 111, the double encrypting section 113, a value non-dependent power length hierarchized-search-key-of-constant-number-having-power-series-length generating section 115, the data inquiring section 120, the range search key generating section 121, and the encryption search key generating section 130.

The second computer 200 is provided with the data inserting section 210, the data searching section 220, the encryption search key comparing section 230, and the encrypted data storing section (encryption DB) 240.

The data input section 110, the encrypting section 111, the double encrypting section 113, the data inquiring section 120, the range search key generating section 121, the encryption search key generating section 130, the data inserting section 210, the data searching section 220, the encryption search key comparing section 230, the encrypted data storing section (the encryption DB) 240 are same as those in the first exemplary embodiment.

In the third exemplary embodiment, because the value non-dependent search-key-of-constant-number generating section 112 in the first exemplary embodiment is changed to the value non-dependent hierarchized-search-key-of-constant-number-having-power-series-length generating section 115, only the difference will be described.

The value non-dependent hierarchized-search-key-of-constant-number-having-power-series-length generating section 115 adds the condition that the set of ranges is selected such that the width of the range has a relation of a power series length and such that a large number of ranges with the range width are selected when the range width is narrow, and a small number of ranges having the range width when the range width is wide, to the condition of the set of ranges selected by the value non-dependent hierarchized-search-key-of-constant-number-having-power-series-length generating section 114 in the second exemplary embodiment.

The fact that the range width has a relation of a power series length means that the ranges have widths expressed by the power series such as $1, 2, 4, 8, \ldots, 2^n$ (n is an optional integer).

A set of ranges is selected such that when the range width is narrow, the ranges having the range width are more, and when the range width is wide, the ranges having the range width are less. This is to suppress the number of ranges having the range width K and containing a value, to a predetermined number or lower.

First, apparently, when the range width is K, the number of values contained in the range is K. Also, N ranges can be defined as ranges having an optional range width K if the range width of the data is N, and a wraparound range is considered.

At this time, there are K ranges which contain some value, of the N ranges having the range width K. For example, it is supposed that the widths of the selected range are K1 and K2 (K1=2*K2) and N ranges are selected for each of the range widths. In this case, the number of ranges containing some value V is K1 in case of the range widths K1, and K2 in case of the range width K2. The number of ranges having the range width K1 is double of the number of ranges having the range width K2.

In order to make the number of ranges constant without depending on the range width, it is necessary to reduce the number of ranges to be selected. In other words, the number of ranges which contain some value V becomes same as the number of ranges having the range width K2 if the number of ranges having the range width K1 is selected to be not N but N/2.

From the above, if the ranges having range widths approximately inverse proportion to a range width are selected, the search keys of a constant number can be allocated to the each range having a corresponding value width.

Also, when the kinds of the range width are selected to have a relation of power series length, the range widths of O(log N) kinds at most are selected to the range width N of the data.

As a result, the number of search keys which are related to some value can be suppressed to O(log N) at most. Also, when the ranges related to the search keys are selected to meet the condition in this exemplary embodiment, it is possible to express an optional range with a combination of the O(log N) search keys at most in case of range search.

It will be described using a simple example.

It is supposed that a data range is from 1 to 8, and
a range width 1: [1, 1], [2, 2], [3, 3], [4, 4], [5, 5], [6, 6], [7, 7], and [8, 8],
a range width 2: [1, 2], [3, 4], [5, 6], and [7, 8],
a range width 4: [1, 4], and [5, 8], and
a range width 8: [1, 8]
are selected as a set of ranges which meets the condition in this exemplary embodiment.

Because a search key corresponding to the search of a range having an optional width (N-K) is equivalent to a logical negation of the search key corresponding to the search of a range having the range width K, it is not necessary to consider the search of the range which is larger than the width N/2. In other words, the search of a range of the range width 7 is equivalent to the search of a range of the range width 1.

Therefore, the range search of the ranges having widths which are larger than "4" is not considered.

Next, because the number of ranges which contain a value is constant in the set of ranges having the respectively selected range widths, the set of ranges having the respective selected range widths has the nature to cover the whole range uniformly (there is no a part not to cover out of the range).

In other words, all values are covered in at least one range.

Next, when there is not a search key corresponding to some range search, it is supposed that the search key corresponding to the search of the range having a width which is smaller than the width M is configured from search keys.

At this time, the respective range widths have a relation of power series length. When this relation is considered with the nature, a range having the width of M/2 or more is always contained. For example, in the search to the range from 1 to 4, the range of [1, 4] is contained in the range which has the width of "4". Also, the range of [3, 4] which has the width "2" is contained in the search to the range from "2" to "5". In the same way, in the range search of the width of "3" in the optional range, it would be found that the range which has the width of "2" is always contained.

In other words, it is found that a range is configured as a combination of one range having the width equal to or less than M/2 and at most two ranges having the width equal to or less than M/2. It is possible to configure the search of a range from "2" to "5" from the range of [3, 4] and two range searches equal to or more than "2" and equal to less than "2" and equal to or more than "5" and equal to less than "5".

The left range search can be resolved by applying this operation at most log M/2 times. In other words, it is possible to express as a combination of the at most O(log M) search keys.

An optional range search can be configured by a combination of at most O(log N) the search keys.

In this exemplary embodiment, a search key is configured based on the set of ranges such that the range width has a relation of power series length and the number of selected ranges having the range width is large when the range width is narrow and the number of selected ranges having the range width is small when the range width is wide. Therefore, the insertion cost and the search cost of the data can be suppressed.

It should be noted that the above-mentioned exemplary embodiments can be carried out as a combination.

Specific Examples

Next, using specific examples, an operation of the present invention will be described.

The range search system of the present invention can be separated into the encryption DB client (terminal) which issues an inquiry of a range search and a data insertion, and the encryption DB server which retains the encrypted data and the double encrypted data as the index of the encrypted data.

First, the encryption DB client acquires the data to be stored in the encryption DB, the encryption data generation key, the encryption search key generation key, and the inquiry of the range search by methods of reading from the file and the data stored in the memory, inputting data from an input unit such as the keyboard, and receiving data from the network.

Also, the encryption DB server stores the data to be stored in the encryption DB, in the storage unit such as HDD and a memory in the form of a file and a table of the database. Here, it is supposed that the data to be stored in the encryption DB has a range from 0 to 15. It is supposed that the data of the value of "5" should be inserted in the encryption DB now. The encrypted data is generated from this data by using the encryption data generation key.

For example, as a method of generating, a common key cryptograph like DES and AES, and a public key cryptograph like RSA are used. Also, if it is not necessary to decrypt the encrypted data, a one-way hash function like "SHA-1", "MD5", and a pseudo random number generator like and "ANSI X9.31" may be used. When improving a safety more, the same value may be encrypted to be different encrypted data by linking a suitable value such as nonce to the value.

Here, as a result, it is supposed that value "5" is encrypted to data of "E5". Original data is encrypted into another data in which the original data cannot be inferred. However, for easy understanding of the description here, it is supposed that the original is encrypted into another data from which the original data can be inferred. Hereinafter, it is the same.

Next, a search key for a range search is generated from the data.

Example 1

A method is shown of generating the search key based on a binary code as example 1.

First, the encryption DB client expresses each of data in a range in a binary notation as shown in FIG. 7. The ranges are defined by respectively grouping a range having a common upper 1-bit data, a range having a common 2-bit data, a range having a common upper 3-bit data, and a range having a common 4-bit data in the binary notation.

In this example,
16 ranges having the width of "1", [0, 0], [1, 1], . . . , [15, 15];
8 ranges having the width of "2", [0, 1], [2, 3], . . . , [14, 15];
4 ranges having the width of "4", [0, 3], [4, 7], [8, 11], [12, 15];
2 rages having the width of "8", [0, 7], [8, 15]; and a range having the width of "16", [0, 15], are selected as a set of ranges.

This set of selected ranges may be retained as cash on a memory and a disk, and calculated every time.

At this time, the ranges which contain the value of "5" are 5 ranges of [5, 5], [4, 5], [4, 7], [0, 7], [0, 15]. Therefore, the encryption DB client generates "kb0101", "kb010*", "kb01", "kb0*", "kb****" as the search keys corresponding to the respective ranges. It should be noted that "*" indicates "0" or "1" and in this example, and a range is expressed in a combination of "0", "1", and "*" uniquely. Hereinafter, it is the same.

Next, the generated search key is encrypted by using the encryption search key generation key.

Because it is sufficient in this encryption if the condition that the original search key can not be inferred from the generated encryption search key is satisfied, the encryption DB client carries out encryption using a common key encryption such as DES and AES, a public key encryption like RSA, and one-way hash function such as "SHA-1" and "MD5".

Here, it is supposed that as a result, the encryption DB client has generated "E_kb0101", "E_kb010*", "E_kb01", "E_kb0*", and "E_kb****".

Next, the encryption DB client encrypts the encrypted data by using the encryption search key, to generate the double encrypted data. In this case, anything is adopted as the encryption DB client if a set of the original encryption search key and the encrypted data cannot be inferred from the generated double encrypted data. For example, the encryption may be carried out by using the common key encryption such as DES and AES, the public key encryption such as RSA, and the one-way hash function such as "SHA-1" and "MD5".

In this case, as a result, "H_E5_E_kb0101", "H_E5_E_kb010*", "H_E5_E_kb01", "H_E5_E_kb0*", and "H_E5_E_kb****" are supposed to have been generated.

Next, the encryption DB client transmits the set of the encrypted data and the double encrypted data to the encryption DB server. Then, the encryption DB server relates and records the encrypted data and the double encrypted data.

For example, the encryption DB server has each line as a record as shown in FIG. 8, and stores the transferred data in the table which has a column of the encrypted data, and a column of the double encrypted data. Here, FIG. 8 shows that data about value of "5" is added as the last record.

Next, referring to FIG. 8, a specific example of the range search will be described.

The encryption DB client carries out the range search to the records stored in the encryption DB as shown in FIG. 8. Here, first, it is supposed that an inquiry of the search to the range from 4 to 5 is issued. In this case, because the range [4, 5] is contained in the selected set of ranges, the encryption DB client generates (kb010*) as the logical equation of the search key. Then, the encryption DB client encrypts this search key "kb010*" to generate the encryption search key "E_kb010*", and (E_kb010*) can be obtained as the logical equation of the encryption search key. The encryption DB client transmits this search key to the encryption DB server. When receiving the search key, the encryption DB server double-encrypts the encrypted data of each record in the table with the received search key, and checks whether or not the double encryption result is contained as the double encrypted data.

First, the double encryption is carried out to the record on the first line of the table shown in FIG. 8.

Because the encrypted data of this record is "E6", the search double encrypted data "H_E6_E_kb010*" is obtained by encrypting the encrypted data with the encryption search key "E_kb010*". It is checked whether or not this "H_E6_E_kb010*" exists as the double encrypted data. Because the search double encrypted data does not exist as the double encrypted data in this example, "false" is returned as the result of the search to this record by using the encryption search key "E_kb010*". The logical equation (E_kb010*) of the encryption search key is "E_kb010*", and this record is not added to the match list because the result is "false".

Next, the double encryption is carried out to the record with the second line of the table shown in FIG. 8.

Because the encrypted data of this record is "E4", the search double encrypted data "H_E4_E_kb010*" is obtained by encrypting this with encryption search key "E_kb010*". It is checked whether or not this "H_E4_E_kb010*" exists as the double encrypted data. Because the search double encrypted data exists in this example, "true" is returned as the result of the search to this record by using the encryption search key "E_kb010*". The logical equation of the encryption search key (E_kb010*) is "E_kb010*", and therefore, the record is added to the match list because this result is "true".

Hereinafter, in the same way, the search is repeated to all the records in a similar procedure. As a result, the data meeting the logical equation of the encryption search key are "E4" and "E5" (the data obtained by encrypting value of "4" and value of "5", respectively), and these are returned as the search result. Also, when an inquiry is to the range from "4" to "6", for example, a search key of (OR kb010* kb0110) is generated, because the search range is expressed as the logical summation of the range of [4, 5] and the range of [4, 6]. After the encryption, the logical equation (OR E_kb010*E_kb0110) of the encryption search key of is transmitted to the encryption DB server.

Because the logical equation of this encryption search key has the two encryption search keys, the search double encrypted data is generated for each of the two encryption search keys and the logical equation is evaluated.

First, when the double encrypted data generated for the record on the first line of the table in FIG. 8 are "H_E6_E_kb010*" and "H_E6_E_kb0110". At this time, because there is not the double encrypted data which matches "H_E6_E_kb010*", "false" is returned as the result of "E_kb010*", and because there is the double encrypted data which matches "H_E6_E_kb0110", "true" is returned as the result of "E_kb0110". In this example, because the logical summation of these results is "true", this record is added to the match list.

When a similar procedure is repeated to all the records, data of "E6", "E4", and "E5" can be obtained (obtained by encrypting value of "6", value of "4", and value of "5", respectively) for the match list, and these are returned as the search result.

Example 2

The method of generating a search key for the range search from the other data will be described. Here, the method of generating a search key based on a gray code notation is shown as the example 2.

First, each value in the range is expressed in a gray code notation as shown in FIG. 9.

Because a method of converting from the binary code, which is generally used in the computer, to the gray code is known, it is sufficient to calculate an exclusive logical summation of the binary code which is subjected to right shift by one bit and the original binary code. The gray code has a characteristic that the hamming distance is "1" in the bit expression of the neighbor values.

In the definition of the range, the values are selected that the mutual hamming distance is n or lower in neighboring $2^n$ values in the gray code notation.

It is supposed that the range width is "4" as an example. At this time, the mutual hamming distance must become equal to or less than "2".

In case of the range of [0, 3], because upper 2 bits of these four values are common to "00" and only the lower 2 bits are different, the mutual hamming distance falls in a range equal to or less than "2" and this range is selected.

On the other hand, in case of the range of [1, 4], because lower 3 bits are different in "1" and "4" so that the hamming distance is "3", this range is not selected.

In this example, as an example of the width of "1", 16 ranges of [0, 0], [1, 1], ..., [15, 15];

as an example of the width of "2", 16 ranges of [0, 1], [1, 2], ..., [14, 15], [15, 0];

as an example of the width of "4", 8 ranges of [0, 3], [2, 5], ..., [12, 15], [14, 1];

as an example of the width of "8", 4 ranges of [0, 7], [4, 11], [8, 15], [12, 3]; and as an example of the width of "16", 1 range of [0, 15] are a selected set of ranges.

At this time, because the ranges containing value of "5" are 8 ranges of [5, 5], [4, 5], [5, 6], [2, 5], [4, 7], [0 7], [4, 11], and [0, 15], for example, "kb0111", "kb011*", "kb01*1", "kb0*1*", "kb01", "kb0*", "kb*1", "kb**" are generated as the search keys corresponding to the respective ranges and related by value 5.

The advantage which uses the set of the ranges selected thus is in that the number of search keys necessary in case of search can be suppressed.

Especially, when a range is selected based on a value in a binary code, when the range search should be carried out to over the boundaries of the range because a boundary is between the ranges as a boundary aligned between "7" and "8", the number of search keys necessary increases.

However, when selecting a range is selected based on a value in a gray code, the above problem is eliminated so that the number of the necessary search keys can be suppressed in range search.

Example 3

Moreover, the method of generating a search key for the range search from the other data will be described. Here, the method of generating a search key based on a redundant gray code notation of a value as example 3 is shown.

The redundant gray code notion is obtained by calculating $2^n$ times of a real number expression in the gray code expressed with n+1 bits.

Because two expressions are possible about one value, this notation is called a redundant gray code notion ("Gray Code and Real Number" <http://www.i.h.kyoto-u.ac.jp/-tsuiki/bit/gray.html>).

First, all values are expressed with the redundant gray code as shown in FIG. 10.

The conversion from the binary code which is generally used in a computer into the redundant gray code is relatively easy, and the redundant gray code notation can be obtained by carrying out gray code conversion to twice of a value in a binary code and by carrying out gray code conversion to ((twice of a value in a binary code)−1). Then, as the definition of the range, the ranges that the mutual hamming distance is n or less are selected in neighboring $2^n$−1 ranges in the gray code notation.

In this example, as ranges having the width of "1", 16 ranges of [0, 0], [1, 1], ..., [15, 15];

as ranges having the width of "3", 16 ranges of [0, 2], [1, 3], ..., [15, 1];

as ranges having the width of "5", 8 ranges of [0, 4], [2, 6], ..., [14, 2];

as ranges having the width of "9", 4 ranges of [0, 8], [4, 12], [8, 0], [12, 4]; and as ranges having the width of "16", 1 range of [0, 15], are selected as a set of ranges.

In this expression, the ranges are defined to be separated by 1, 2, and 4 on both sides from a center of a value.

At this time, the ranges which contain value of "5" are 8 ranges of [5, 5], [3, 5], [4, 6], [5, 7], [2, 6], [4, 8], [0, 8], [4, 12], [0, 15]. Therefore, as the search keys corresponding to the respective ranges, for example, "kb011*1", "kb0*10*", "kb011**", "kb01*1*", "kb0*1", "kb01*", "kb0****", "kb*1*", and "kb**" are generated.

Moreover, the ranges having the range widths of "5" and "9" emerge twice or three times depending on the value. Although a case of the value of "5" emerges twice, for example, a case of the value of "8" emerges three times.

Therefore, in case of existence of twice to the ranges having the range widths of "5" and "9", dummy search keys of "kdummy5" and "kdummy9" are respectively given, to prevent a deviation in the number of the search keys depending on the value.

After all, as for value of "5", a total of 10 search keys of "kdummy5" and "kdummy9" and the above-mentioned 8 search keys are allocated.

The set of ranges selected thus can be used in case where a range search having a value as a center is carried out and a range search is carried out to a real number, in such a manner that in a map which is divided into lattices, one lattice and lattices around the lattice are to be passed through.

The present invention can be applied to a field in which a service is provided in the form of ASP (Application Service Provider) and SaaS (Service as a Service) and a user leaves data on the side of the server safely.

As mentioned above, the range search system to the encryption DB according to the present invention is provided with a section configured to generate search keys for range search of a predetermined number without depending on the value of the data.

The search key generating section is provided with a section configured to generate the search keys for a narrow range search and a wide range search.

The search key generating section is provided with a section configured to generate the search keys for the range search such that range widths allocated for one data has a power series relation.

The range search system of the present invention is provided with an encrypting section, an encryption search key generating section, a double encrypting section, an encrypted data storage section, a range search key generating section and a data searching section. The encrypting section encrypts data to be inserted to generate encrypted data. The encryption search key generating section encrypts search keys. The double encrypting section encrypts the encrypted data with the encryption search key to generate double encrypted data. The encrypted data storage section relates and retains the encrypted data and the double encrypted data. The range search key generating section generates the encryption search key for the range search from an inquiry of the range search. The data searching section double-encrypts the encrypted data stored in the encrypted data storage section with the encryption search key generated by the range search key generating section, and determines a range search result by determining whether or not the double encrypted data which coincides with the double encryption result exists.

The method of range search to the encryption DB in the present invention generates search keys of a predetermined number for the range search without depending on the value of the data.

Moreover, the method of search range in the present invention generates the search keys for narrow range width and wide range width.

Moreover, the method of search range in the present invention generates the search keys for the range search such that the range widths allocated for one data have a power series length relation.

In the method of search range in the present invention, data to be inserted is encrypted so as to generate encrypted data. Next, each of the search keys is encrypted so as to generate the encryption search keys. Next, the encrypted data is encrypted with the encryption search key so as to generate double encrypted data. Next, the encrypted data and the double encrypted data are related and retained. Next, the encryption search keys are generated for the range search from the inquiry of the range search. Next, the encrypted data stored in the encryption DB is double encrypted with the encryption search key generated by a range search key generating section and a range search result is determined by determining whether or not the double encrypted data which coincides with a result exists.

The program of the present invention is a program to make a computer execute the processing which generates search keys of a predetermined number for the range search without depending on the value of the data.

In the program of the present invention, the generating the search keys makes a computer execute the processing which generates the search keys for the narrow range width and the wide range width for one data.

Moreover, in the program of the present invention, the generating the search keys makes a computer execute the processing which generates the search keys such that the range widths allocated for one data have a power series length relation.

The program of the present invention is for making a computer encryption processing, encryption search key generation processing, double encryption processing, encrypted data storage processing, range search key generation processing, and data search processing. In the encryption processing, the computer encrypts the data to be inserted to generate encrypted data. In the encryption search key generation processing, the computer encrypts the search keys. In the double encryption processing, the computer encrypts the encrypted data with the encryption search key to generate double encrypted data. In the encrypted data storage processing, the computer relates and retains the encrypted data and the double encrypted data. In the range search key generation processing, the computer generates the encryption search keys for the range search from an inquiry of the range search. In the data search processing, the computer double-encrypts the encrypted data stored in the encrypted data storage section with each of the encryption search keys generated by the range search key generating section, and determines a range search result by determining whether or not the double encrypted data which coincides with a result exists.

A terminal which is used in the range search system of the present invention is provided with a section of generating a search key of a predetermined number for range search without depending on a value of the data, an encrypting section for encrypting data to be inserted to generate encrypted data, an encryption search key generating section for encrypting the search keys, and a double encrypting section for encrypting the encrypted data with each of the encryption search keys to generate double encrypted data.

The server which is used in the range search system of the present invention is provided with an encrypted data storing section for relating and retaining the encrypted data and the double encrypted data, and an data searching section for double-encrypting the encrypted data stored in the encrypted data storage section with the encryption search key transferred from the terminal and determining a range search result by determining whether or not the double encrypted data which coincides with a result exists.

As mentioned above, the encryption DB system of the present invention is provided with a section of generating search keys of a predetermined number without depending on value to the data, relates and stores the double encrypted data based on each of generated search keys to the encrypted data, and carries out a range search based on the search keys corresponding and the range from an inquiry of the range search. The purpose of the present invention can be achieved by adopting the above configuration and eliminating a deviation in the number of search keys which are related to the data stored in the encryption DB.

Also, this search key is related to the range, but the section of generating the search keys further operates to relate the search keys for a wide range width and a narrow range width to each data. The purpose of the present invention can be achieved by adopting such a configuration and by realizing an inquiry of a less number of the search keys to an optional range search.

Moreover, the section of generating the search keys further operates in such a manner that the range widths related to each data have a power series length relation. The purpose of the present invention can be achieved by adopting such a configuration, suppressing the number of search keys which are related to each data, and realizing the inquiry of a less number of the search keys to an optional range search.

The first effect is in that it is possible to carry out a search to the encryption DB which prevents un-intentional information leakage. The reason is in that a constant number of search keys are generated without depending on the value.

The second effect is in that data insertion can be made small. The reason is in that the constant number of search keys are generated without depending on the value, and the number of the search keys can be suppressed to O(log N) at most.

The third effect is in data search cost can be made small. The reason is in that because the search keys which are related to some data are prepared in a hierarchy from the search key for a narrow range to the search key for a wide ranges, it is sufficient to prepare inquiries of at most O(1)-O(log M) to the range M of an optional range search.

In the above, the exemplary embodiments of the present invention have been described in detail. Actually, the present invention is not limited to the above-mentioned exemplary embodiments, and various modifications can be made in a range which does not deviate from the spirit of the present invention.

It should be noted that this patent application claims a priority based on Japan Patent Application No. JP 2009-176986, and the disclosure thereof is incorporated herein by reference.

The invention claimed is:

1. A range search system comprising:
    data input means for receiving an encryption data generation key, an encryption search key generation key, and data to be inserted in an encryption DB (database);
    encrypting means for encrypting said data by using said encryption data generation key to generate encrypted data;
    search key generating means for generating search keys for a range search;
    encryption search key generating means for encrypting the search keys of the range search by using said encryption search key generation key to generating encryption search keys; and
    double encrypting means for encrypting said encrypted data by using each of the encryption search keys,
    wherein said search key generating means generates the search keys for range search, and
    wherein a number of the search keys is constant without depending on a value of said data.

2. The range search system according to claim 1, wherein said search key generating means generates the search keys corresponding to a case of a narrow range width and a case of a wide range width for one data.

3. The range search system according to claim 1, wherein said search key generating means generates the search keys for one data such that said range widths have a relation of power series length.

4. The range search system according to claim 1, further comprising:
    data inquiring means for receiving information of ranges to be inquired to said encryption DB; and
    range search key generating means for generating the search keys corresponding to said range,
    wherein said data inquiring means generates an inquiry based on the range search keys corresponding to said range, to issue to said encryption DB.

5. A range search method to an encryption DB (database) by a computer, said method comprising:
    receiving an encryption data generation key, an encryption search key generation key, and data to be inserted in said encryption DB;
    encrypting the data by using the encryption data generation key, to generate encrypted data;
    generating search keys of a predetermined number for a range search;
    encrypting said search keys by using said encryption search key generation key, to generate encryption search keys; and
    encrypting said encrypted data by using said encryption search key;
    wherein a number of the search keys is constant without depending on a value of said data.

6. The range search method according to claim 5, wherein said generating search keys comprises:
    generating said search keys corresponding to a narrow range width and a wide range width for one data.

7. The range search method according to claim 5, wherein said generating search keys comprises:
    generating said search keys for one data such that allocated range widths have a relation of power series length.

8. The range search method according to claim 5, further comprising:
    receiving information of the range to be inquired to said encryption DB;
    generating the search keys corresponding to said range; and
    generating an inquiry based on the search keys corresponding to said range to issue to said encryption DB.

9. A computer-readable non-transitory recording medium in which a computer-executable range search program code is stored to attain a range search method which comprises:
    receiving data, encryption data generation key, and an encryption search key generation key to be inserted in an encryption DB (database);
    encrypting said data by using said encryption data generation key, to generate encrypted data;
    generating search keys of a predetermined number for range search;
    encrypting said search keys by using said encryption search key generation key, to generate encryption search keys; and
    encrypting said encrypted data by using said encryption search key;
    wherein a number of the search keys is constant without depending on a value of said data.

10. The computer-readable non-transitory recording medium according to claim 9, wherein said generating search keys comprises:
    generating said search keys corresponding to a narrow range width and a wide range width for one data.

11. The computer-readable non-transitory recording medium according to claim 9, wherein said generating search keys comprises:
    generating said search keys for one data such that allocated range widths have a relation of power series length.

12. The computer-readable non-transitory recording medium according to claim 9, further comprising:
    receiving information of the range to be inquired to said encryption DB;
    generating the search keys corresponding to said range; and
    generating an inquiry based on the search keys corresponding to said range to issue to said encryption DB.

* * * * *